(12) United States Patent
Shimizu et al.

(10) Patent No.: US 12,463,082 B2
(45) Date of Patent: Nov. 4, 2025

(54) ROBOT HAND, ROBOT AND FIXING DEVICE

(71) Applicant: Kawasaki Jukogyo Kabushiki Kaisha, Kobe (JP)

(72) Inventors: Ippei Shimizu, Kobe (JP); Yoshiki Maeda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 853 days.

(21) Appl. No.: 17/628,901

(22) PCT Filed: Jul. 10, 2020

(86) PCT No.: PCT/JP2020/027145
§ 371 (c)(1),
(2) Date: Jan. 21, 2022

(87) PCT Pub. No.: WO2021/015023
PCT Pub. Date: Jan. 28, 2021

(65) Prior Publication Data
US 2022/0254675 A1 Aug. 11, 2022

(30) Foreign Application Priority Data
Jul. 24, 2019 (JP) .................................. 2019-135952

(51) Int. Cl.
*H01L 21/687* (2006.01)
*B25J 15/00* (2006.01)
*F16B 5/02* (2006.01)

(52) U.S. Cl.
CPC .... *H01L 21/68707* (2013.01); *B25J 15/0014* (2013.01); *F16B 5/0233* (2013.01)

(58) Field of Classification Search
CPC ................ H02K 7/06; H01L 21/68707; H01L 21/67766; B25J 15/0014; B25J 11/0095;
(Continued)

(56) References Cited
U.S. PATENT DOCUMENTS 4,611,960 A * 9/1986 Quenneville ....... B23B 31/1075
409/234
4,854,844 A * 8/1989 Carlsen ................... F16H 25/20
425/141
(Continued)

FOREIGN PATENT DOCUMENTS

CN 102043351 A 5/2011
CN 114423575 A * 4/2022 .............. B25J 9/042
(Continued)

*Primary Examiner* — Topaz L. Elliott
(74) *Attorney, Agent, or Firm* — XSENSUS LLP

(57) ABSTRACT

A robot hand to hold a substrate, which includes a base body, a blade defining a holding position for holding the substrate and attached at a base part to the base body, and a differential screw having a center axis perpendicular to a principal surface of the substrate existing at the holding position and configured to attach the base part of the blade to the base body. The differential screw includes a first threaded part having a first pitch, a second threaded part having a second pitch different from the first pitch, and an intervening member coaxially having a third threaded part to be threadedly engaged with the first threaded part, and a fourth threaded part to be threadedly engaged with the second threaded part. The first threaded part is provided to the base body, and the second threaded part is provided to the base part of the blade.

6 Claims, 11 Drawing Sheets

(58) Field of Classification Search
CPC .... B25J 15/00; B25J 9/06; B25J 13/00; F16B 5/0233; F16B 5/0225; F16B 5/0275; B65G 49/07
See application file for complete search history.

(56) References Cited

U.S. PATENT DOCUMENTS

| | | | |
|---|---|---|---|
| 6,294,025 B1 * | 9/2001 | Kinder | H01L 21/68771 |
| | | | 118/728 |
| 2008/0124206 A1 | 5/2008 | Choi et al. | |
| 2014/0346742 A1 | 11/2014 | Theubet et al. | |
| 2016/0343599 A1 * | 11/2016 | Nakamura | H01L 21/67259 |
| 2022/0250255 A1 * | 8/2022 | Shimizu | H01L 21/68 |
| 2023/0234791 A1 * | 7/2023 | Kinoshita | B25J 15/00 |

FOREIGN PATENT DOCUMENTS

| | | | | |
|---|---|---|---|---|
| GB | 216395 A * | 5/1924 | | G01B 3/18 |
| JP | 51-45185 U | 4/1976 | | |
| JP | 9-213768 A | 8/1997 | | |
| JP | 2008-110408 A | 5/2008 | | |
| JP | 2008-141158 A | 6/2008 | | |
| JP | 2008-300609 A | 12/2008 | | |
| JP | 2014-530118 A | 11/2014 | | |
| JP | 2015-37173 A | 2/2015 | | |
| JP | 2015-161331 A | 9/2015 | | |
| KR | 101578876 B1 * | 12/2015 | | B25J 15/06 |

* cited by examiner (A)

(B)

(A)

(B)

(A)

(B)

ROBOT HAND, ROBOT AND FIXING DEVICE

CROSS-REFERENCE TO RELATED APPLICATIONS

The present application is based on PCT filing PCT/JP2020/027145, filed Jul. 10, 2020, which claims priority to JP 2019-135952, filed Jul. 24, 2019, the entire contents of each are incorporated herein by reference.

TECHNICAL FIELD

The present disclosure relates to a robot hand, a robot, and a fixing device.

BACKGROUND ART

Conventionally, robot hands for holding a substrate are known. This kind of robot hand is disclosed in Patent Document 1 as a wafer transferring device, for example. The wafer transferring device of Patent Document 1 is disposed adjacent to a cassette which accommodates a plurality of wafers, and an inspection device for inspecting the wafers. The wafer transferring device is provided with a plurality of Y-shaped or U-shaped wafer supporting members, a first supporting stand and a second supporting stand coupled to base ends of the wafer supporting members to support the wafer supporting members, and a movable device coupled to the first and second supporting stands to linearly move the wafer supporting members.

Moreover, conventionally, fixing devices for securing a differential screw are known. This kind of fixing device is disclosed in Patent Document 2 as a clamping device, for example. Patent Document 2 describes that a differential screw is engaged with an adjustment sledge so as not to contact a collet, and thus, wear of a collet adapter and the collet can be kept to the minimum. Further, it is described that the differential screw is disposed inside the collet adapter so as to be replaceable.

REFERENCE DOCUMENTS OF CONVENTIONAL ART

Patent Documents

[Patent Document 1] JP2008-141158A
[Patent Document 2] JP2014-530118A

DESCRIPTION OF THE DISCLOSURE

Problem to be Solved by the Disclosure

However, the robot hand of Patent Document 1 and other conventional robot hands for holding the substrate have a problem that it is difficult to adjust an inclination of a blade which defines a holding position for holding the substrate.

Further, the fixing device of Patent Document 2 and other conventional fixing devices for securing the differential screw may allow the movement of the differential screw in the middle of securing the differential screw. Therefore, the conventional fixing devices have a problem that the differential screw cannot be precisely secured.

Therefore, one purpose of the present disclosure is to provide a robot hand and a robot having the same, capable of easily adjusting an inclination of a blade defining a holding position for holding a substrate.

Moreover, another purpose of the present disclosure is to provide a fixing device, capable of precisely securing a differential screw.

SUMMARY OF THE DISCLOSURE

In order to solve the problem, a robot hand according to the present disclosure is a robot hand configured to hold a substrate, which includes a base body, a blade defining a holding position for holding the substrate and attached at a base part to the base body, and a differential screw having a center axis perpendicular to a principal surface of the substrate existing at the holding position and configured to attach the base part of the blade to the base body. The differential screw includes a first threaded part having a first pitch, a second threaded part having a second pitch different from the first pitch, and an intervening member coaxially having a third threaded part to be threadedly engaged with the first threaded part, and a fourth threaded part to be threadedly engaged with the second threaded part. The first threaded part is provided to the base body, and the second threaded part is provided to the base part of the blade.

According to this configuration, the robot hand according to the present disclosure can move the part of the base part of the blade where the second threaded part is provided, by a difference between a first distance which is a product of the first pitch of the first threaded part and the number of rotations of the intervening member, and a second distance which is a product of the second pitch of the second threaded part and the number of rotations of the intervening member. Therefore, the inclination of the blade which defines the holding position for holding the substrate can easily be adjusted.

In order to solve the problem, a fixing device according to the present disclosure is a fixing device configured to secure a differential screw. The differential screw includes a first threaded part having a first pitch, the first threaded part having a second pitch different from the first pitch, and an intervening member coaxially having a third threaded part to be threadedly engaged with the first threaded part, and a fourth threaded part to be threadedly engaged with the second threaded part. When a member in which the first threaded part is formed is a first threaded member, and a member in which the second threaded part is formed is a second threaded member, one of the first and second threaded members is a first slit member in which a first slit is further formed to intersect with the first or second threaded part in a plane perpendicular to an axis of the first or second threaded part formed in the first or second threaded member. A fixing member is attached to the first slit member, the fixing member being configured to eliminate a backlash between the first or second threaded part formed in the first slit member, and the third or fourth threaded part threadedly engaged therewith, by changing a distance between inner walls of the first slit. The other one of the first and second threaded members or the intervening member is a deformable member deformable in a radial direction, and the deformable member is deformed in the radial direction so that backlash between at least one of the first, second, third, and fourth threaded parts formed in the deformable member, and at least one of the first, second, third, and fourth threaded parts threadedly engaged therewith is eliminated.

According to this configuration, the fixing device according to the present disclosure can secure the differential screw without applying external force in the axial direction to the differential screw. As a result, the fixing device according to the present disclosure can precisely secure the differential screw.

Effect of the Disclosure

According to the present disclosure, a robot hand and a robot having the same, capable of easily adjusting an inclination of a blade defining a holding position for holding a substrate, can be provided.

Moreover, according to the present disclosure, a fixing device, capable of precisely securing a differential screw, can be provided.

BRIEF DESCRIPTION OF DRAWINGS

FIG. 5(A) is a view before the adjustment of the inclination, and FIG. 5(B) is a view after the adjustment of the inclination.

FIG. 10(A) is a cross-sectional view in an axial direction, and FIG. 10(B) is a view when seen from an arrow XB illustrated in FIG. 10(A).

FIG. 11(A) is a cross-sectional view in the axial direction, and FIG. 11(B) is a view when seen from an arrow XIB illustrated in FIG. 11(A).

Figure 1:
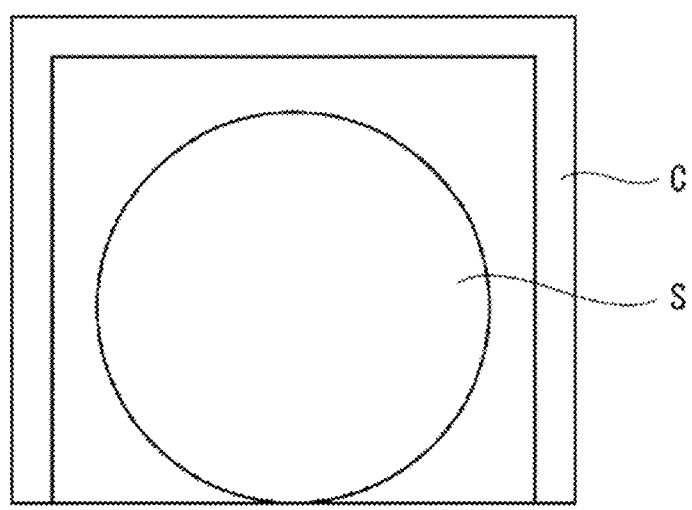
FIG. 1 is a plan view schematically illustrating the entire configuration of a robot hand, and a robot having the robot hand, according to one embodiment of the present disclosure.
Figure 1:
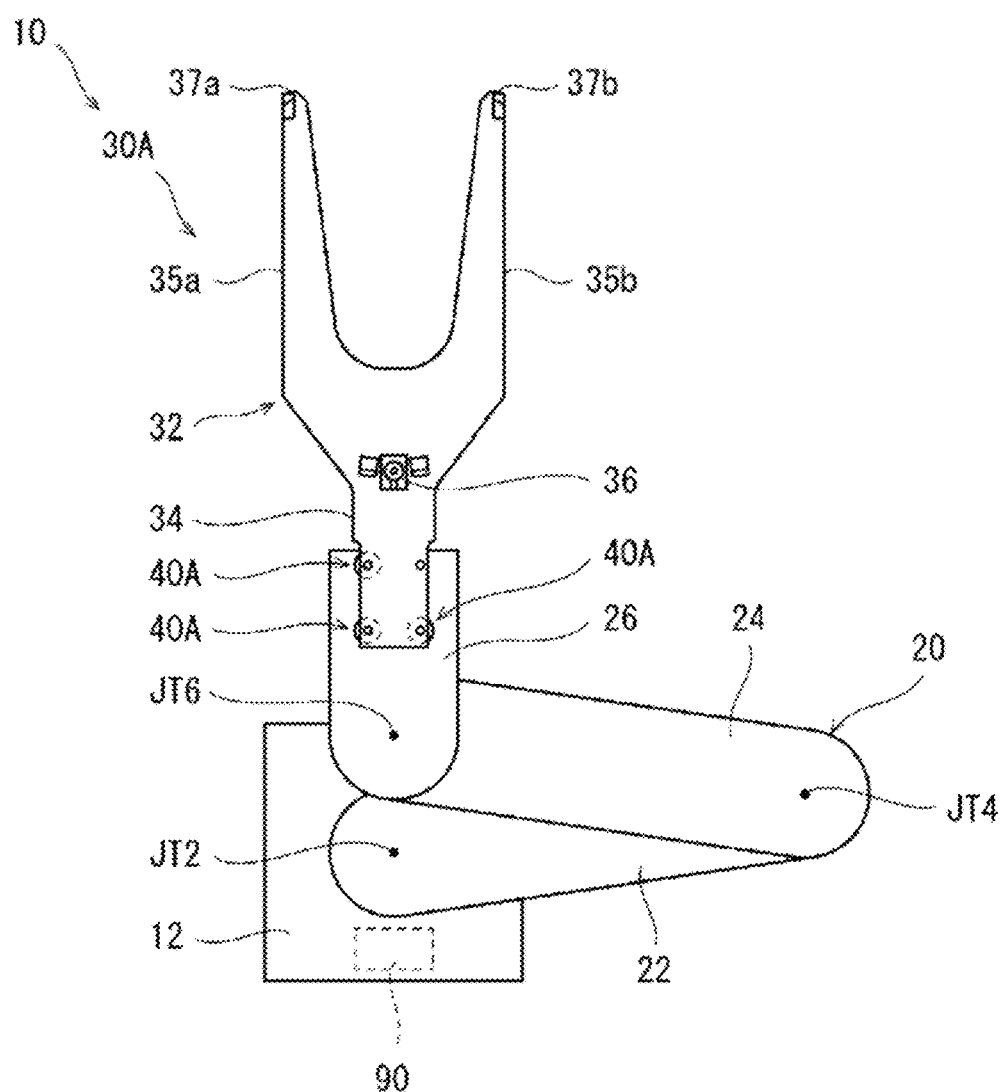

MODES FOR CARRYING OUT THE DISCLOSURE (Entire Configuration)

Hereinafter, a robot hand, a robot having the robot hand, and a fixing device according to one embodiment of the present disclosure, are described with reference to the drawings. Note that this embodiment does not limit the present disclosure. Moreover, below, the same reference characters are given to the same or corresponding elements throughout the drawings, and redundant description thereof is omitted.

(Robot 10)

FIG. 1 is a plan view schematically illustrating the entire configuration of the robot hand, and the robot having the robot hand, according to this embodiment. As illustrated in FIG. 1, a robot 10 is configured as a horizontal articulated robot which transfers a substrate S while holding the substrate S. In detail, the robot 10 can hold the substrate S accommodated in an accommodation device C to take the substrate S out of the accommodation device C, and accommodate the held substrate S inside the accommodation device C.

The robot 10 is provided with a pedestal 12, an elevating shaft (not illustrated) provided to the pedestal 12 to be expandable and contractible in the up-and-down direction, and a robotic arm 20 provided to an upper end of the elevating shaft. The robot 10 further includes a robot hand 30A provided to a tip end of the robotic arm 20. Further, the robot 10 includes a robot control device 90 which controls operation of the robotic arm 20 and the robot hand 30A.

(Pedestal 12 and Robotic Arm 20)

The elevating shaft provided to the pedestal 12 is configured to be expendable and contractible in the up-and-down direction by a ball-screw mechanism etc. (not illustrated), and this ascending-and-descending operation is performed by a servomotor (not illustrated) provided inside the pedestal 12. Moreover, the elevating shaft is provided to the pedestal 12 so as to be rotatable about a joint axis JT2 extending in the vertical direction, and this rotating operation is performed by a servomotor (same as above) provided inside the pedestal 12.

The robotic arm 20 has a first link 22, a second link 24, and a third link 26 each comprised of an elongated member extending horizontally.

The first link 22 is attached, at its base end in the longitudinal direction, to an upper end of the elevating shaft. The first link 22 ascends and descends integrally with the elevating shaft, and rotates about the joint axis JT2, which is in agreement with a center axis of the elevating shaft, integrally with the elevating shaft.

The second link 24 is attached, at its base end in the longitudinal direction, to a tip end of the first link 22 in the longitudinal direction so as to be rotatable about a joint axis JT4 extending in the vertical direction. The rotating operation of the second link 24 with respect to the first link 22 is performed by a servomotor (not illustrated) provided inside the first link 22.

The third link 26 is attached, at its base end in the longitudinal direction, to a tip end of the second link 24 in the longitudinal direction so as to be rotatable about a joint axis JT6 extending in the vertical direction. The rotating operation of the third link 26 with respect to the second link 24 is performed by a servomotor (not illustrated) provided inside the second link 24.

(Robot Control Device 90)

The robot control device 90 includes a memory (not illustrated) and a processor (not illustrated) which executes a program stored in the memory. The processor can servo-control operation of the robot 10 by the two servomotors provided inside the pedestal 12, the servomotor provided inside the first link 22, and the servomotor provided inside the second link 24.

(Robot Hand 30A)

Figure 2:
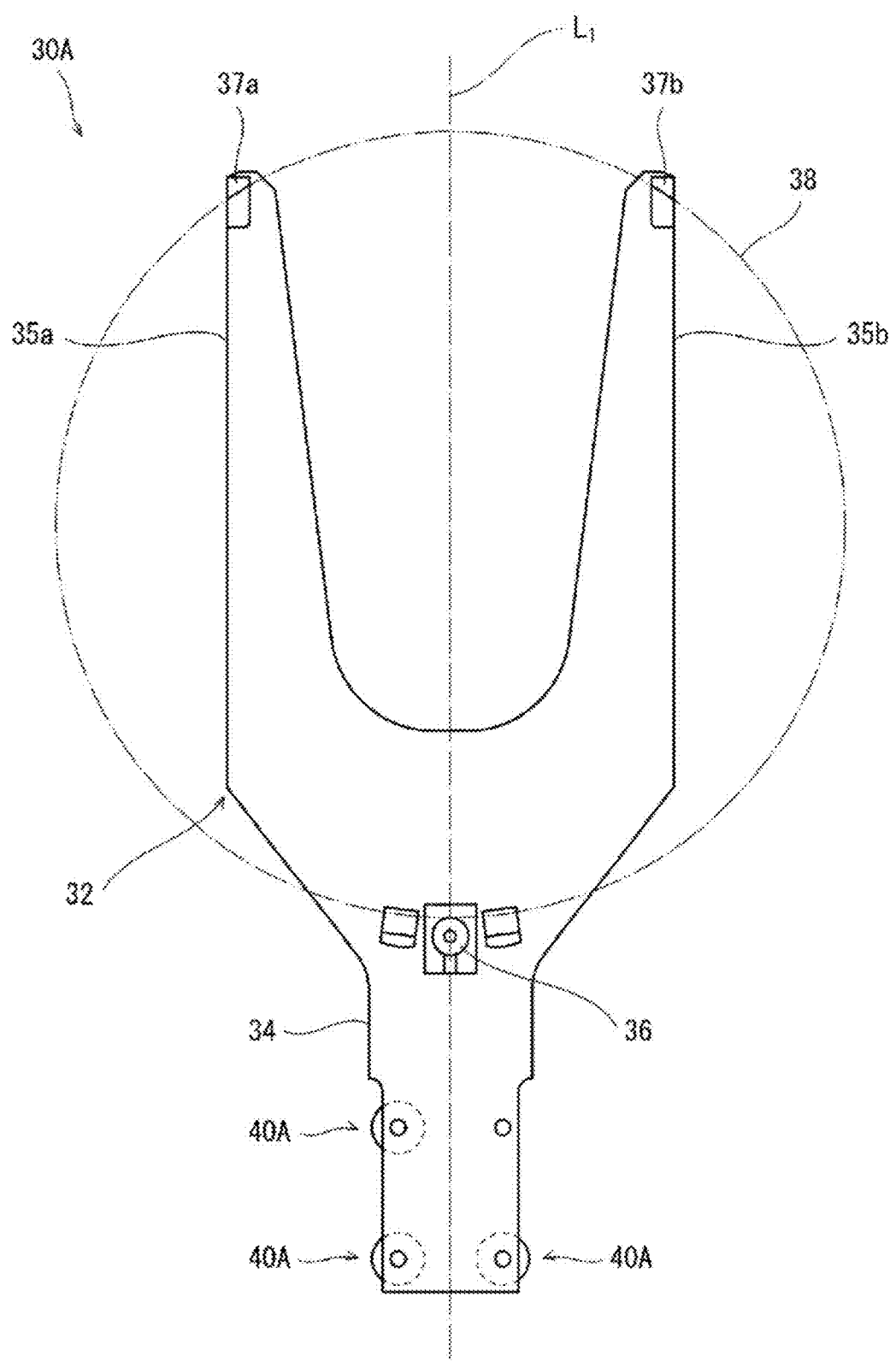
FIG. 2 is a schematic plan view of the robot hand according to this embodiment of the present disclosure.

FIG. 2 is a schematic plan view of the robot hand according to this embodiment. The robot hand 30A is provided with a blade 32 defining a holding position 38 for holding the substrate S, and three differential devices 40A attached to a base part 34 of the blade 32. The holding position 38 is indicated by a two-dot chain line in FIG. 2. The blade 32 further defines a center axis $L_1$ extending from the base end to the tip end at the center in the width direction. The center axis $L_1$ is indicated by a one-dot chain line in FIG. 2. The blade 32 includes the base part 34 attached to a base body 42 (first internally-threaded member) described later, and two tip-end parts 35a and 35b branching from the base part 34 so as to extend toward the tip end.

The tip-end part 35a projects from one end of the base part 34 in the width direction into a plane perpendicular to the thickness direction, and the tip-end part 35b projects from the other end of the base part 34 in the width direction into the plane perpendicular to the thickness direction. The blade 32 includes the base part 34 and the tip-end parts 35a and 35b, and therefore, it has a Y-shape when seen in the thickness direction.

The robot hand 30A includes a movable member 36 provided to the base part 34 so as to be reciprocatable on the center axis $L_1$, a fixed member 37a provided to the tip-end part 35a, and a fixed member 37b provided to the tip-end part 35b. The robot hand 30A can hold the substrate S by pinching the substrate S between the movable member 36 and the fixed members 37a and 37b by moving the movable member 36 to the tip-end side of the center axis $L_1$.

Figure 3:
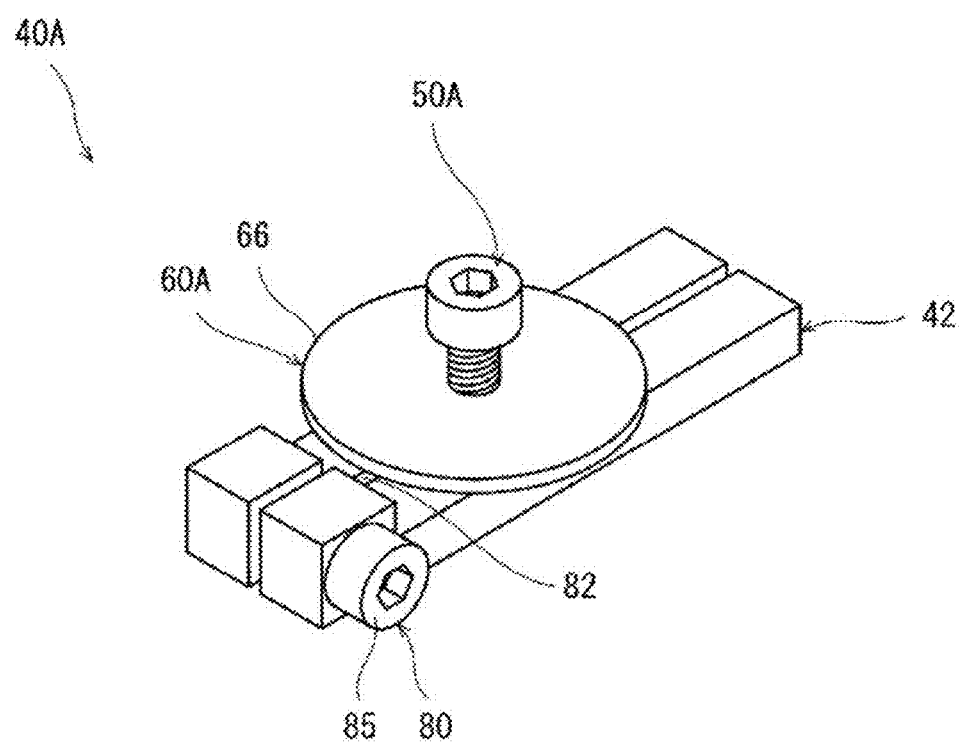
FIG. 3 is a perspective view of a differential device provided to the robot hand according to this embodiment of the present disclosure.
Figure 4:
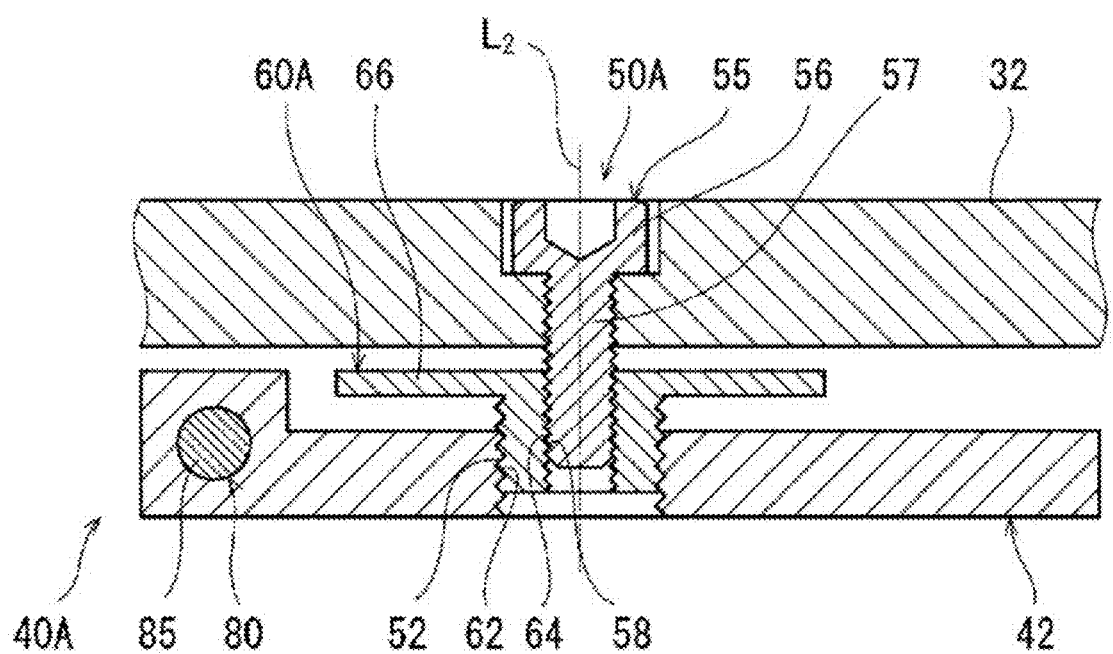
FIG. 4 is a schematic cross-sectional view when the differential device provided to the robot hand according to this embodiment of the present disclosure is attached to a blade.

FIG. 3 is a perspective view of a differential device provided to the robot hand according to this embodiment. FIG. 4 is a schematic cross-sectional view when the differential device is attached to the blade. Note that the three differential devices 40A have the same structure. Therefore, one differential device 40A is described here, and similar description for the other two differential devices 40A is not repeated.

As illustrated in FIGS. 3 and 4, the differential device 40A has the base body 42 fixed to the tip end of the third link 26, and a differential screw 50A which attaches the base part 34 of the blade 32 to the base body 42. Moreover, the differential device 40A further includes a fixing device 80 which fixes the differential screw 50A to the base body 42.

As illustrated in FIG. 4, the differential screw 50A is disposed such that its center axis $L_2$ is perpendicular to a principal surface of the substrate S located at the holding position 38. The differential screw 50A has a first internally-threaded part 52 (first threaded part) having a first pitch and provided to be cut in the base body 42, and a first externally-threaded part 58 (second threaded part) having a second pitch smaller than the first pitch and projecting from the base part 34 of the blade 32. Note that in this embodiment the first internally-threaded part 52 and the first externally-threaded part 58 are both right-handed screw threads.

The first internally-threaded part 52 is formed on an inner wall of a through-hole penetrating the base body 42 in the height direction at the center in the width direction of the base body 42. The first externally-threaded part 58 is formed on an outer wall of a shaft part 57 of a first bolt 55 which is threadedly engaged with a through-hole penetrating the base part 34 of the blade 32 in the height direction. A base-end surface of a head part 56 of the first bolt 55 is located at the same position in the height direction as an upper surface of the base part 34 of the blade 32. The blade 32 is attached at its base part 34 to the base body 42 through the differential screw 50A.

The differential screw 50A further includes an intervening member 60A. The intervening member 60A includes a cylindrical part, and a disk-shaped manipulation part 66 formed in an end part of the cylindrical part on the blade 32 side. The cylindrical part is formed, on its outer wall, with a second externally-threaded part 62 (third threaded part) to be threadedly engaged with the first internally-threaded part 52, and formed, on its inner wall, with a second internally-threaded part 64 (fourth threaded part) to be threadedly engaged with the first externally-threaded part 58. The second externally-threaded part 62 and the second internally-threaded part 64 are coaxial with each other. The manipulation part 66 is provided for rotary manipulation. The axial direction of the manipulation part 66 is in agreement with that of the cylindrical part, the manipulation part 66 has the same inner diameter as the cylindrical part, and has a larger outer diameter than the cylindrical part.

Referring again to FIG. 2, the three differential devices 40A are disposed at different positions from each other in a plane parallel to the principal surface of the substrate S existing at the holding position 38 (the plurality of differential screws are disposed at different positions from each other in the plane parallel to the principal surface of the substrate existing at the holding position). In detail, one of the three differential devices 40A is disposed at one end of the base end of the base part 34 of the blade 32 in the width direction. Another one of the three differential devices 40A is disposed at the other end of the base end of the base part 34 of the blade 32 in the width direction. Further another one of the three differential devices 40A is disposed at one end in the width direction at the center of the base part 34 of the blade 32.

(One Example of Mode of Adjusting Inclination of Blade 32)

Figure 5:
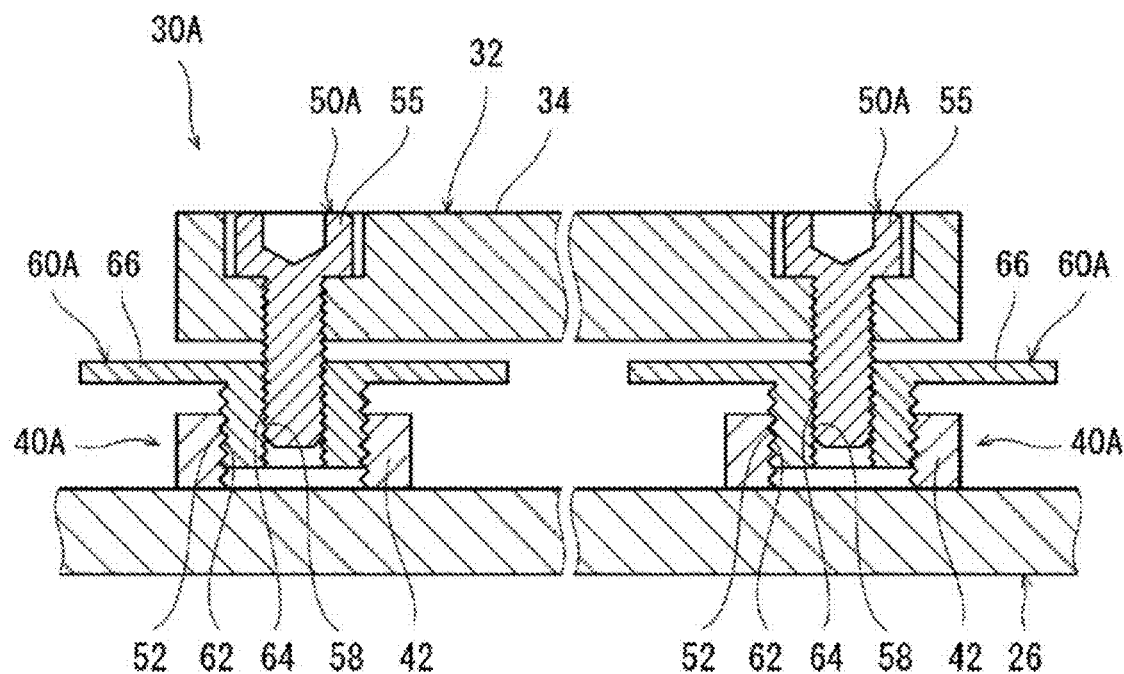
FIGS. 5(A) and 5(B) are schematic views illustrating a situation of adjusting an inclination of the blade provided to the robot hand according to this embodiment of the present disclosure, where
Figure 5:
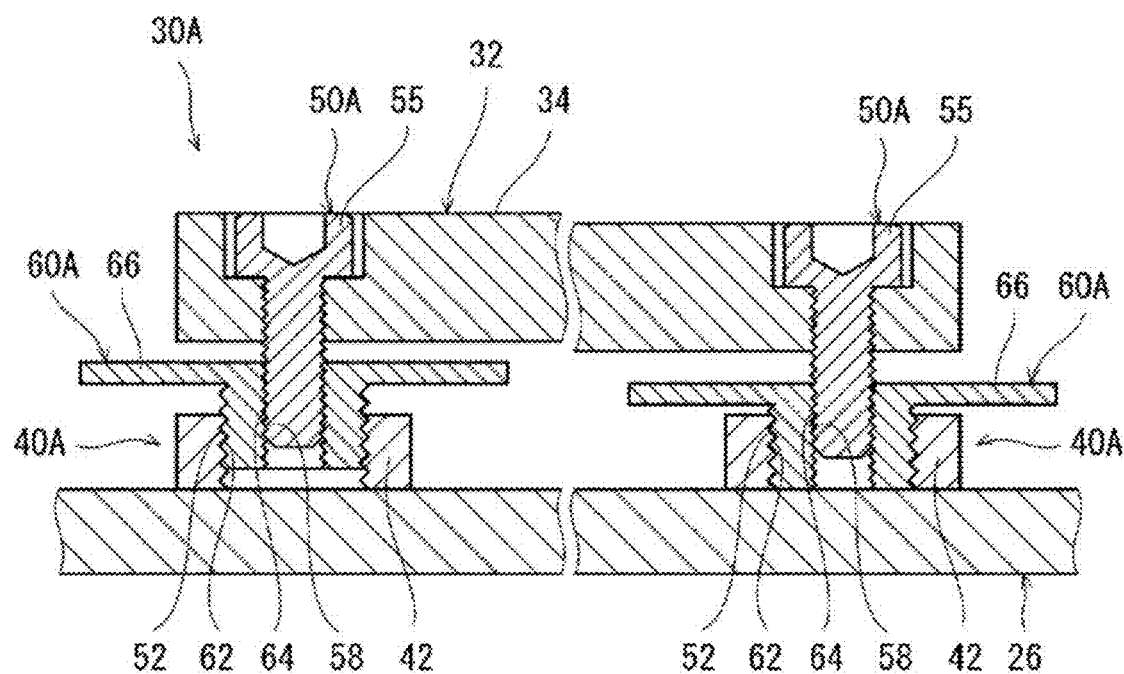

One example of a mode of adjusting an inclination of the blade 32 is described based on FIGS. 5(A) and 5(B). Moreover, effects achieved by the robot hand 30A according to this embodiment are also described. FIGS. 5(A) and 5(B) are schematic views illustrating a situation of adjusting the inclination of the blade provided to the robot hand according to this embodiment of the present disclosure, where FIG. 5(A) is a view before the adjustment of the inclination, and FIG. 5(B) is a view after the adjustment of the inclination.

Here, FIGS. 5(A) and 5(B) are cross-sectional views when the base part 34 of the robot hand 30A is cut in a plane perpendicular to the center axis $L_1$. In FIGS. 5(A) and 5(B), the left side is a side provided with the tip-end part 35a of the blade 32, and the right side is a side provided with the tip-end part 35b of the blade 32. The blade 32 inclines such that the tip-end part 35b of the blade 32 is located higher than the tip-end part 35a of the blade 32.

In order to adjust such an inclination of the blade 32, the tip-end part 35b of the blade 32 is lowered. In detail, the manipulation part 66 of the differential device 40A disposed on the right side in FIGS. 5(A) and 5(B) is rotated in the counter-clockwise direction, so that the intervening member 60A moves downwardly.

In other words, the intervening member 60A is moved downwardly relative to the base body 42 by a first distance, and is moved downwardly relative to the blade 32 by a second distance shorter than the first distance. Here, the first distance is a product of the first pitch of the first internally-threaded part 52 and the number of rotations of the intervening member 60A. Moreover, the second distance is a product of the second pitch of the first externally-threaded part 58 and the number of rotations of the intervening member 60A.

By the robot hand 30A according to this embodiment rotating the manipulation part 66 as described above, a part of the base part 34 of the blade 32 to which the first externally-threaded part 58 is provided is downwardly moved by a difference between the first distance and the second distance, and thus, the inclination of the blade 32 is easily adjustable.

Particularly, for example, in a case where the accommodation device C densely accommodates a plurality of substrates S in the height direction, it is required to precisely adjust the inclination of the blade 32 in advance so that the blade 32 does not collide with an inner wall of the accommodation device C and the substrate S inside the accommodation device C. Improvement in this accuracy is further demanded accompanying with the recent downsizing of the substrate S. However, in the current situation, for example, external force is simply applied to the blade 32 by manpower so as to adjust the inclination of the blade 32, which may take considerable time and effort for the adjustment of the inclination of the blade 32. In this respect, by using the robot hand 30A according to this embodiment, effects, such as shortening of the work time and saving of labor, can be achieved, and thus, the inclination of the blade 32 can easily and precisely be adjusted.

Moreover, according to this embodiment, the plurality of differential devices 40A (in other words, the plurality of differential screws 50A) are disposed at different positions from each other in the plane parallel to the principal surface of the substrate S existing at the holding position 38. Therefore, for example, when compared with a case where only one differential device 40A is provided, the inclination of the blade 32 can be adjusted further easily.

Moreover, according to this embodiment, since the intervening member 60A is provided with the manipulation part 66 for the rotary manipulation, the inclination of the blade 32 can be adjusted further easily.

(Modifications)

It is apparent for a person skilled in the art from the above description that many improvements and other embodiments of the present disclosure are possible. Therefore, the above description is to be interpreted only as illustration, and it is provided in order to teach a person skilled in the art the best mode for implementing the present disclosure. The details of the structures and/or the functions may be substantially changed, without departing from the spirit of the present disclosure.

(Modification 1)

Figure 6:
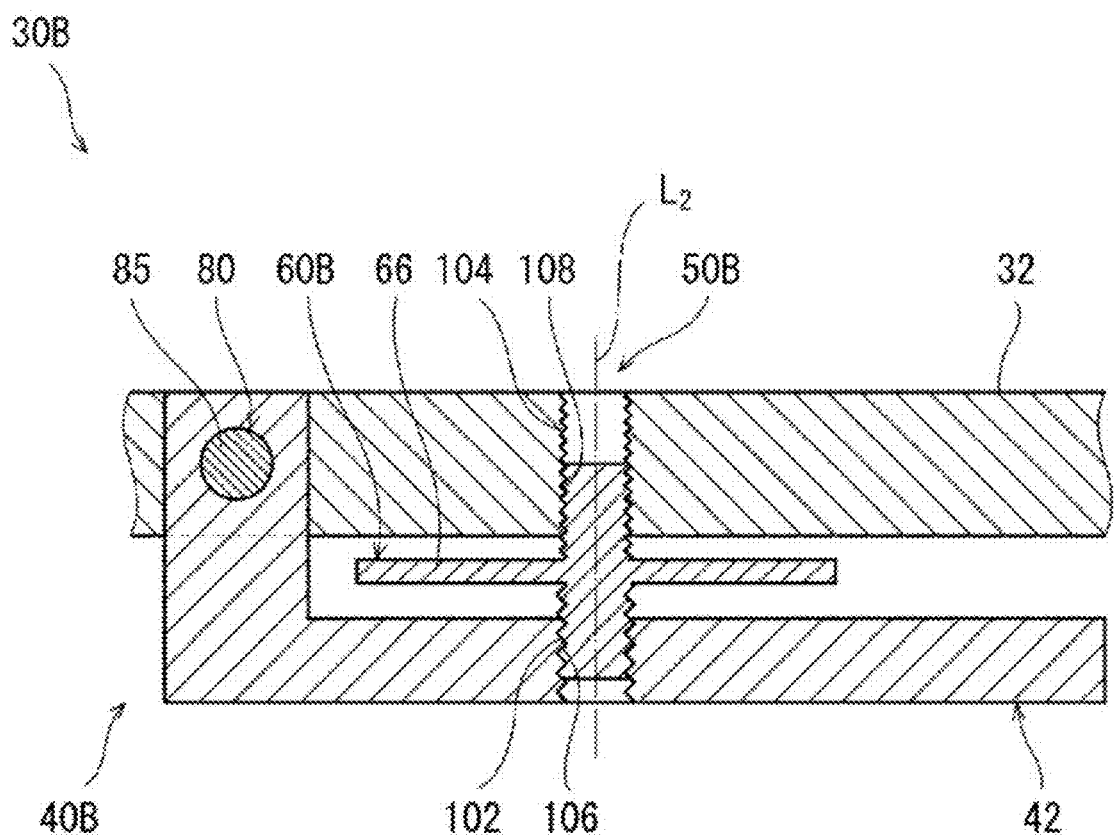
FIG. 6 is a schematic cross-sectional view illustrating Modification 1 of the robot hand according to the embodiment of the present disclosure.

FIG. 6 is a schematic cross-sectional view illustrating Modification 1 of the robot hand according to the embodiment described above. Note that a robot hand 30B of this modification has the same structure as the robot hand 30A according to the above embodiment, except for a structure of a differential screw 50B. Therefore, the same reference characters are given to the same parts to omit similar description.

As illustrated in FIG. 6, the differential screw 50B according to this modification is provided with a third internally-threaded part 102 (first threaded part) having the first pitch and provided to be cut in the base body 42, and a fourth internally-threaded part 104 (second threaded part) having the second pitch smaller than the first pitch, and provided to be cut in the blade 32. Note that in this modification the third internally-threaded part 102 and the fourth internally-threaded part 104 are both right-handed screw threads.

The third internally-threaded part 102 is formed on an inner wall of a through-hole penetrating the base body 42 in the height direction at the center in the width direction of the base body 42. The fourth internally-threaded part 104 is formed on an inner wall of a through-hole penetrating the blade 32 in the height direction.

In this embodiment, an intervening member 60B includes the disk-shaped manipulation part 66, a third externally-threaded part 106 (third threaded part) projecting toward the base body 42 from the center of the manipulation part 66 to be threadedly engaged with the third internally-threaded part 102, and a fourth externally-threaded part 108 (fourth threaded part) projecting toward the blade 32 from the center of the manipulation part 66 to be threadedly engaged with the fourth internally-threaded part 104. The third externally-threaded part 106 and the fourth externally-threaded part 108 are coaxial with each other.

Since the robot hand 30B according to this modification includes the differential screw 50B with the above structure, it achieves similar effects to the robot hand 30A according to the embodiment described above.

(Modification 2)

Figure 7:
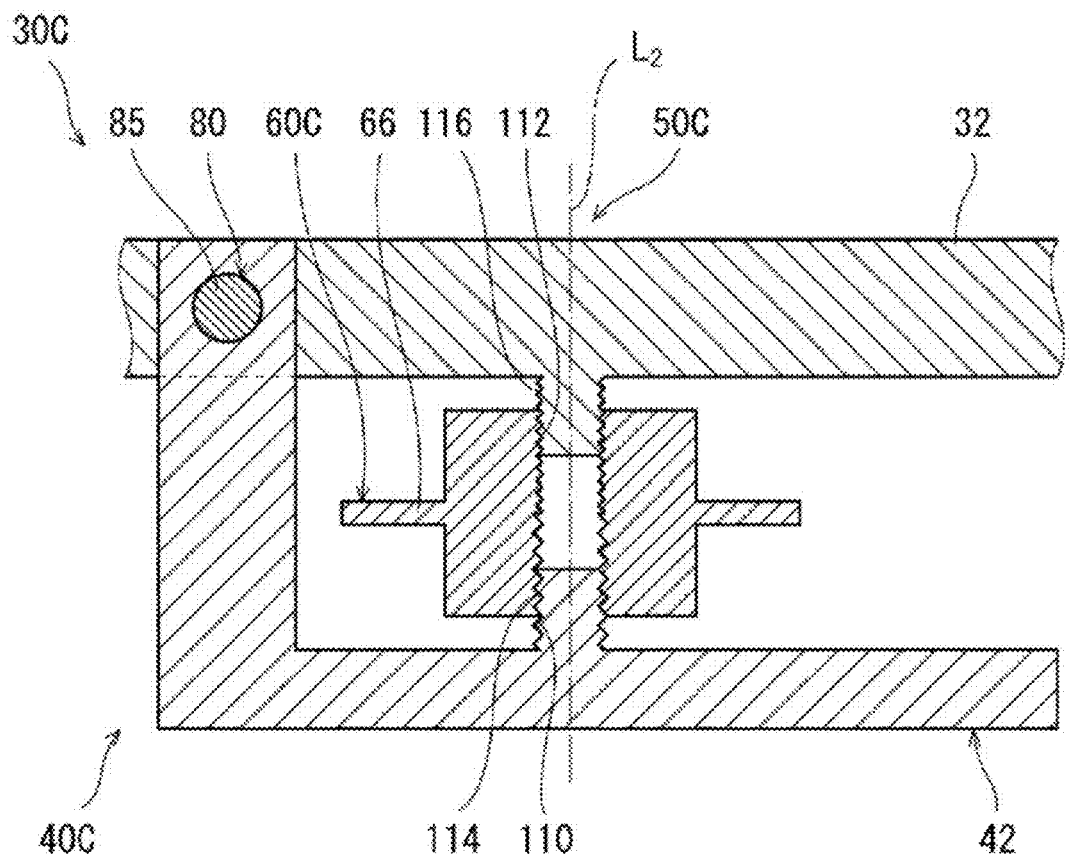
FIG. 7 is a schematic cross-sectional view illustrating Modification 2 of the robot hand according to the embodiment of the present disclosure.

FIG. 7 is a schematic cross-sectional view illustrating Modification 2 of the robot hand according to the embodiment described above. Note that a robot hand 30C according to this modification has the same structure as the robot hand 30A according to the above embodiment and the robot hand 30B according to the modification, except for a structure of a differential screw 50C. Therefore, the same reference characters are given to the same parts to omit similar description.

As illustrated in FIG. 7, the differential screw 50C according to this modification is provided with a fifth externally-threaded part 110 (first threaded part) having the first pitch and provided to be projected from the base body 42, and a sixth externally-threaded part 112 (second threaded part) having the second pitch smaller than the first pitch and provided to be projected from the blade 32. Note that in this modification the fifth externally-threaded part 110 and the sixth externally-threaded part 112 are both right-handed screw threads.

The fifth externally-threaded part 114 is formed on an outer wall of a shaft part projecting from the center of the base body 42 in the width direction. The sixth externally-threaded part 112 is formed on an outer wall of a shaft part projecting from the center of the base part 34 of the blade 32 in the width direction.

In this modification, an intervening member 60C includes a cylindrical part, and the disk-shaped manipulation part 66 provided to the cylindrical part at the center in the axial direction so as to be coaxial with the cylindrical part. The diameter of the manipulation part 66 is larger than that of the cylindrical part.

The cylindrical part of the intervening member 60C is formed therein with a shaft hole. The shaft hole is formed, in a part of its inner wall on the base body 42 side, with a fifth internally-threaded part 114 (third threaded part) to be threadedly engaged with the fifth externally-threaded part 110, and is formed, in a part of its inner wall on the blade 32 side, with a sixth internally-threaded part 116 (fourth threaded part) to be threadedly engaged with the sixth externally-threaded part 112. The fifth internally-threaded part 114 and the sixth internally-threaded part 116 are coaxial with each other.

Since the robot hand 30C according to this modification includes the differential screw 50C with the above structure, it achieves similar effects to the robot hand 30A according to the embodiment described above.

(Modification 3)

Figure 8:
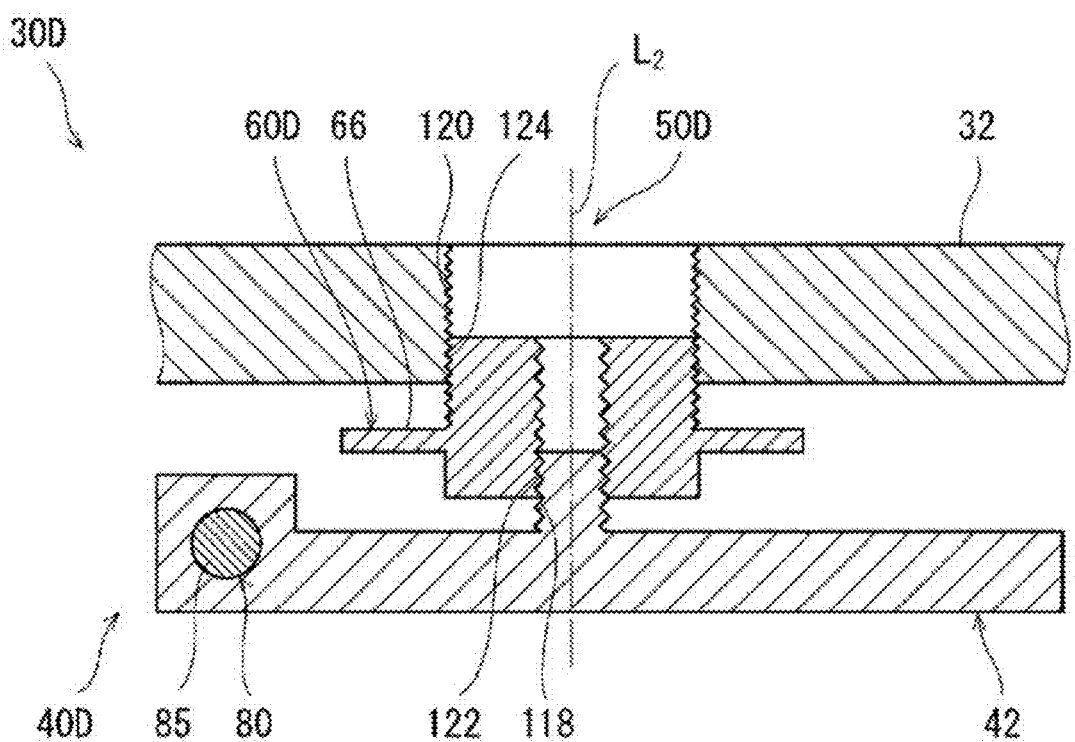
FIG. 8 is a schematic cross-sectional view illustrating Modification 3 of the robot hand according to the embodiment of the present disclosure.

FIG. 8 is a schematic cross-sectional view illustrating Modification 3 of the robot hand according to the embodiment described above. Note that a robot hand 30D of this modification has the same structure as the robot hand 30A according to the above embodiment and the robot hands 30B and 30C according to the modifications, except for a structure of a differential screw 50D. Therefore, the same reference characters are given to the same parts to omit similar description.

As illustrated in FIG. 8, the differential screw 50D according to this modification is provided with a seventh externally-threaded part 118 (first threaded part) having the first pitch and provided to be projected from the base body 42, and a seventh internally-threaded part 120 (second threaded part) having the second pitch smaller than the first pitch and provided to be projected from a bracket 70. Note that in this modification the seventh externally-threaded part 118 and the seventh internally-threaded part 120 are both right-handed screw threads.

The seventh externally-threaded part 118 is formed on an outer wall of a shaft part projecting from the base body 42 at the center in the width direction. The seventh internally-threaded part 120 is formed on an inner wall of a through-hole penetrating a base end of the bracket 70 in the height direction at the center in the width direction.

In this embodiment, an intervening member 60D includes a cylindrical part, and the disk-shaped manipulation part 66 provided to the cylindrical part at the center in the axial direction so as to be coaxial with the cylindrical part. The diameter of the manipulation part 66 is larger than that of the cylindrical part.

The cylindrical part of the intervening member 60D is formed therein with a shaft hole. The shaft hole is formed, on its inner wall, with an eighth internally-threaded part 122 (third threaded part) to be threadedly engaged with the seventh externally-threaded part 118. Moreover, the cylindrical part of the intervening member 60D is formed, on its outer wall on the blade 32 side of the manipulation part 66, with an eighth externally-threaded part 124 to be threadedly engaged with the seventh internally-threaded part 120. The eighth internally-threaded part 122 and the eighth externally-threaded part 124 are coaxial with each other.

Since the robot hand 30D according to this modification includes the differential screw 50D with the above structure, it achieves similar effects to the robot hand 30A according to the embodiment described above.

(Modification 4)

Figure 9:
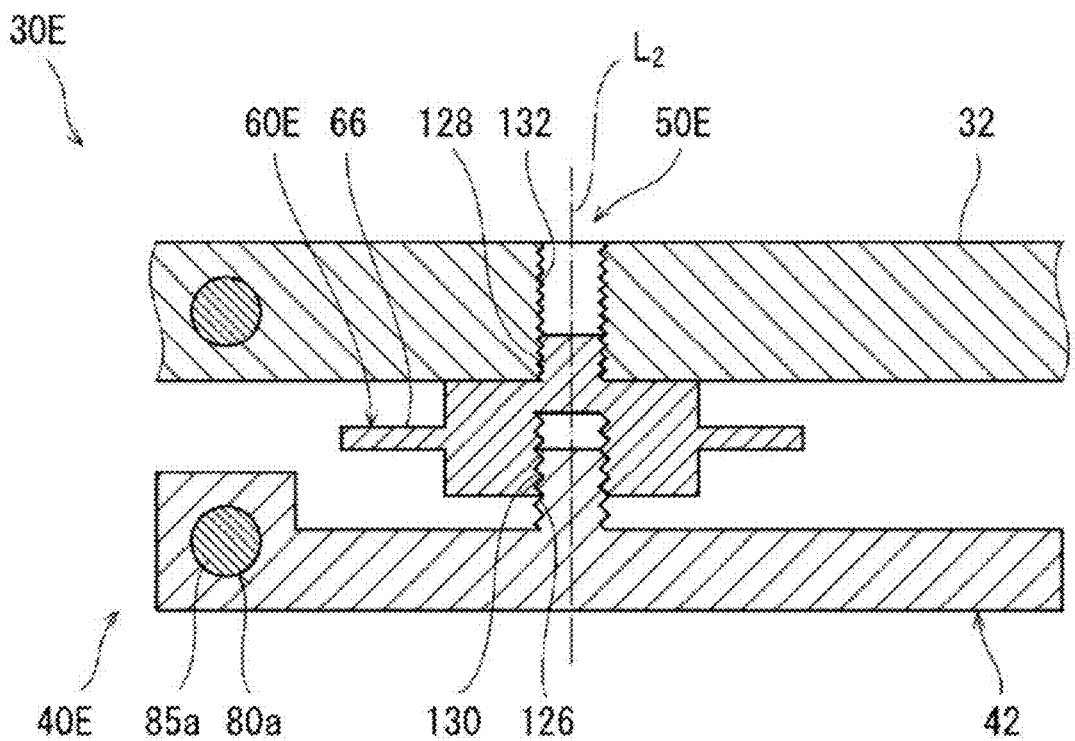
FIG. 9 is a schematic cross-sectional view illustrating Modification 4 of the robot hand according to the embodiment of the present disclosure.

FIG. 9 is a schematic cross-sectional view illustrating Modification 4 of the robot hand according to the embodiment described above. Note that a robot hand 30E of this modification has the same structure as the robot hand 30A according to the above embodiment and the robot hands 30B to 30D according to the modifications, except for a structure of a differential screw 50E. Therefore, the same reference characters are given to the same parts to omit similar description.

As illustrated in FIG. 9, the differential screw 50E according to this modification is provided with a ninth externally-threaded part 126 (first threaded part) having the first pitch and provided to be projected from the base body 42, and a ninth internally-threaded part 128 (second threaded part) having the second pitch smaller than the first pitch and provided to be projected from the base part 34 of the blade 32. Note that in this modification the ninth externally-threaded part 126 and the ninth internally-threaded part 128 are both right-handed screw threads.

The ninth externally-threaded part 126 is formed on an outer wall of a shaft part projecting from the base body 42 at the center in the width direction. The ninth internally-threaded part 128 is formed on an inner wall of a through-hole penetrating the base part 34 of the blade 32 in the height direction.

In this embodiment, an intervening member 60E includes a cylindrical part, and the disk-shaped manipulation part 66 provided to the cylindrical part at the center in the axial direction so as to be coaxial with the cylindrical part. The diameter of the manipulation part 66 is larger than that of the cylindrical part.

The cylindrical part of the intervening member 60D is formed therein with a concave part from the center of a bottom surface (i.e., a surface on the base body 42 side) to near an upper surface (i.e., a surface on the blade 32 side). On an inner surface of the concave part, a tenth internally-threaded part 130 to be threadedly engaged with the ninth externally-threaded part 126 is formed. Moreover, a shaft part is formed to be projected from the center of the upper surface of the cylindrical part of the intervening member 60D, and on an outer wall of the shaft part, a tenth externally-threaded part 132 to be threadedly engaged with the ninth internally-threaded part 128 is formed.

Since the robot hand 30E according to this modification includes the differential screw 50E with the above structure, it achieves similar effects to the robot hand 30A according to the embodiment described above.

(Other Modifications)

In the embodiment described above, the base body 42 and the third link 26 are separate members. However, it is not limited to the case, but the third link 26 may be configured to be a base body. Accordingly, the first threaded part may be formed in the third link 26 itself.

In the embodiment described above, the blade 32 and the first bolt 55 are separate members. However, it is not limited to the case, but the blade 32 and the first bolt 55 may be formed integrally. Accordingly, the second threaded part may be formed in the blade 32 itself.

In the embodiment described above, the case of adjusting the state of the blade 32 is described, in which the blade 32 inclines such that the tip-end part 35b is higher than the tip-end part 35a. However, it is not limited to the case, but the state of the blade 32 can be similarly adjusted, in which the blade 32 inclines such that the tip-end part 35a is higher than the tip-end part 35b. Further, in order to adjust the blade which inclines such that the tip end of the blade 32 is lower or higher than the base end of the blade 32, the manipulation part 66 of the differential device 40A disposed at one end in the width direction at the center of the base part 34 of the blade 32 may be rotary manipulated.

In the embodiment described above, the robot hand 30A is provided with the three differential devices 40A which are disposed at different positions from each other in the plane parallel to the principal surface of the substrate S existing at the holding position 38. However, it is not limited to the case, but the robot hand 30A may be provided with one or two differential device(s) 40A, or four or more differential devices 40A.

In the embodiment described above, the robot hand 30A holds the substrate S by pinching the substrate S between the movable member 36 provided to the base part 34 so as to be reciprocatable on the center axis $L_1$, and the fixed members 37a and 37b provided to the tip-end parts 35a and 35b, respectively. However, it is not limited to the case, but the robot hand 30A may hold the substrate S by placing the substrate S thereon, sucking the substrate S, etc.

In the embodiment described above, the robotic arm 20 includes three joint axes JT2, JT4, and JT6. However, it is not limited to the case, but the robotic arm 20 may include one or two joint axis (axes), or four or more joint axes.

In the embodiment described above, the blade 32 is integrally formed by a single member from the base part 34 to the tip-end parts 35 and 35b. However, it is not limited to the case, but, for example, only a part of the base part 34 of the blade 32 at which the differential screw 50A is provided, may be formed by a separate member, and the separate member and the other part of the blade 32 may be fixed to each other. Alternatively, the blade 32 may be formed to be divided into three or more members, and these members may be fixed to each other to constitute the blade 32.

In the embodiment described above, the robot 10 is provided with a single robot hand 30A and a single third link 26. However, it is not limited to the case, but the robot 10 may be provided with a plurality of robot hands 30A and third links 26 connected to the plurality of robot hands 30A, respectively (i.e., a plurality of third links 26). In such a case, each of the plurality of third links 26 may be independently rotatable about the joint axis JT6 at its base end in the longitudinal direction.

Then, in this case, for example, when the inclination of the blade 32 is adjusted by simply being applied with external force by manpower, the adjustment of the inclination of the blade 32 takes considerable time and effort as the number of the blades 32 increases. Therefore, if the plurality of robot hands 30A are provided as described above, the work time can further be shortened, and the labor can further be saved.

(Fixing Device 80)

Figure 10:
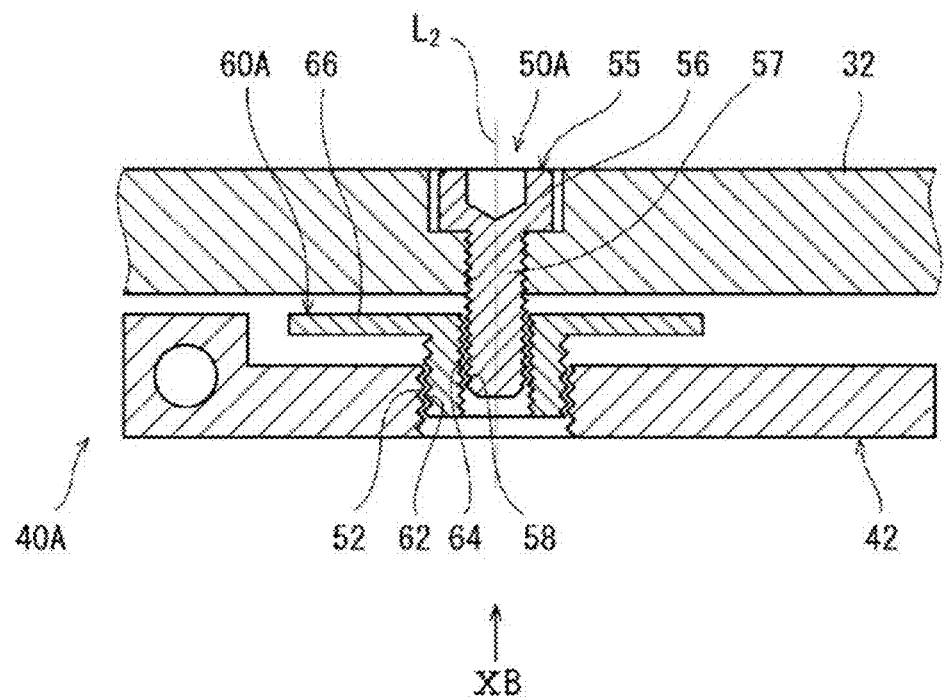
FIGS. 10(A) and 10(B) are schematic views illustrating a situation before a fixing device according to the embodiment of the present disclosure fixes a differential screw, where
Figure 10:
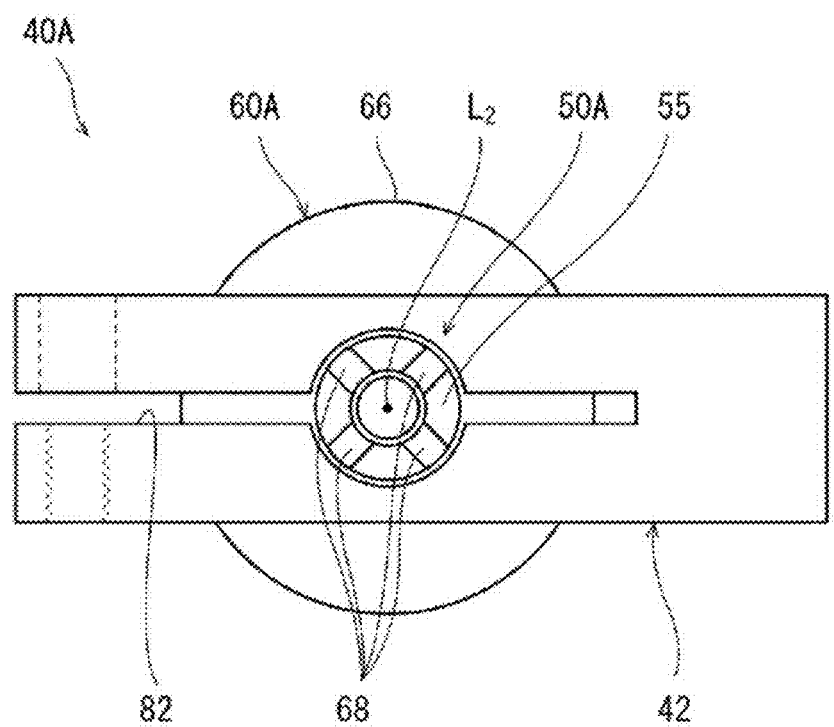
Figure 11:
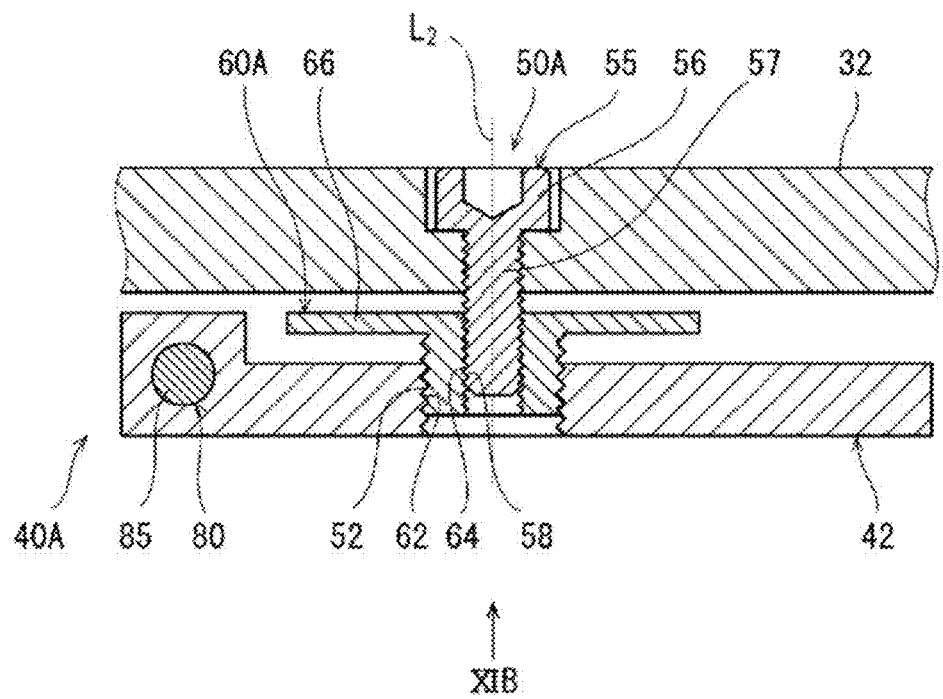
FIGS. 11(A) and 11(B) are schematic views illustrating a situation after the fixing device according to this embodiment of the present disclosure fixes the differential screw, where
Figure 11:
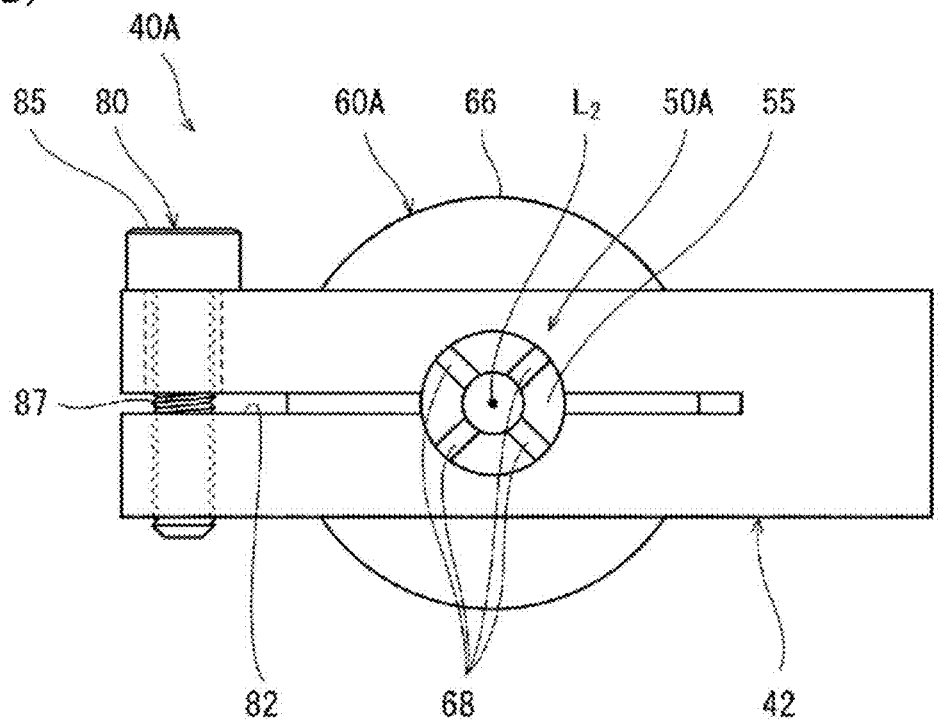

The fixing device 80 which secures (fixes) the differential screw 50A described in the above embodiment, is described based on FIGS. 10(A), 10(B), 11(A), and 11(B). FIGS. 10(A) and 10(B) are schematic views illustrating a situation before the fixing device according to the above embodiment secures the differential screw, where FIG. 10(A) is a cross-sectional view in an axial direction, and FIG. 10(B) is a view when seen from an arrow XB illustrated in FIG. 10(A). FIGS. 11(A) and 11(B) are schematic views illustrating a situation after the fixing device secures the differential screw, where FIG. 11(A) is a cross-sectional view in the axial direction, and FIG. 11(B) is a view when seen from an arrow XIB illustrated in FIG. 11(A).

As described in the above embodiment, the differential screw 50A includes the first internally-threaded part 52 (first threaded part) having the first pitch, and the first externally-threaded part 58 (second threaded part) having the second pitch smaller than the first pitch. Further, the differential screw 50A includes the cylindrical intervening member 60A having the second externally-threaded part 62 (third threaded part) and the second internally-threaded part 64 (fourth threaded part) which are coaxial with each other. The second externally-threaded part 62 is formed on the outer wall of the intervening member 60A to be threadedly engaged with the first internally-threaded part 52. The second internally-threaded part 64 is formed on the inner wall of the intervening member 60A to be threadedly engaged with the first externally-threaded part 58.

The fixing device 80 is provided with a first slit 82 which is formed in the base body 42 (first threaded member, first slit member) where the first internally-threaded part 52 is formed, so as to intersect with the first internally-threaded part 52 in the plane perpendicular to the axis of the first internally-threaded part 52. Moreover, the fixing device 80 is further provided, to the base body 42, with a second bolt 85 (fixing member) which eliminates backlash (play) between the first internally-threaded part 52 formed in the base body 42 and the second externally-threaded part 62 of the intervening member 60A (deformable member) to be threadedly engaged with the first internally-threaded part 52, by shortening the distance between inner walls of the first slit 82 (i.e., by changing the distance between the inner walls of the first slit).

The second bolt 85 is disposed such that a shaft part 87 thereof intersects with the first slit 82 in the plane perpendicular to the axial direction of the differential screw 50A.

The fixing device 80 is further provided with two second slits 68 formed at an end part of the intervening member 60A on the base body 42 side in the axial direction. One of the two second slits 68 is formed on a first straight line passing the center of the intervening member 60A when the intervening member 60A is seen from the end part on the base body 42 side. The other one of the two second slits 68 is formed on a second straight line passing the center of the intervening member 60A when the intervening member 60A is seen from the end part on the base body 42 side. The first straight line and the second straight line are orthogonal to each other.

Since the intervening member 60A includes the two second slits 68 as described above, it is deformable in the radial direction. By the second bolt 85 contracting the intervening member 60A in the radial direction (by deforming the deformable member in the radial direction), the backlash between the second externally-threaded part 62 and the second internally-threaded part 64 formed in the intervening member 60A, and the first internally-threaded part 52 and the first externally-threaded part 58 threadedly engaged therewith, respectively, is eliminated.

In the fixing device 80 according to the embodiment, the first internally-threaded part 52 is deformed to be contracted in the radial direction as the inner walls of the first slit 82 approach each other. Therefore, the differential screw 50A can be secured without being applied with external force in the axial direction of the differential screw 50A. As a result, the fixing device 80 according to the present disclosure can precisely fix the differential screw 50A.

Particularly, for example, the fixing device 80 is useful when the differential screw 50A is used for adjusting the inclination of the blade 32 like the embodiment. That is, for example, in a case where the inclination of the blade 32 is adjusted, and then the differential screw 50A is fixed by being attached with a nut at the end part in the axial direction of the differential screw 50A, the differential screw 50A is applied with external force in the axial direction, and thus, the blade 32 inclines again. On the other hand, by using the fixing device 80 according to the embodiment to fix the differential screw 50A, the external force in the axial direction is not applied to the differential screw 50A, and thus, the blade 32 does not incline again.

Moreover, since in the fixing device 80 according to the embodiment the second bolt 85 is attached to the base body 42 as the fixing member, the inner walls of the first slit 82 can be brought closer to each other with the simple structure.

Moreover, the fixing device 80 according to the embodiment is provided with the two second slits 68 formed in the end part of the intervening member 60A on the base body 42 side in the axial direction. Therefore, the intervening member 60A is deformable to be contracted in the radial direction as the inner walls of the first slit 82 approach each other. As a result, the first internally-threaded part 52, the second internally-threaded part 64, the first externally-threaded part 58, and the second externally-threaded part 62 of the differential screw 50A are firmly fixed to each other. Moreover, by the two second slits 68 being disposed as described above, the intervening member 60A is deformable to be contracted in the radial direction independent from a rotational position of the intervening member 60A.

(Modifications)

It is apparent for a person skilled in the art from the above description that many improvements and other embodiments of the present disclosure are possible. Therefore, the above description is to be interpreted only as illustration, and it is provided in order to teach a person skilled in the art the best mode for implementing the present disclosure. The details of the structures and/or the functions may be substantially changed, without departing from the spirit of the present disclosure.

In the embodiment described above, the first internally-threaded part 52 (first threaded part) is formed in the base body 42 and the base body 42 is the first threaded member, and the first externally-threaded part 58 (second threaded part) is formed in the blade 32 and the blade 32 is the second threaded member. Further, the first slit 82 is formed in the base body 42 (first threaded member) and the base body 42 is the first slit member.

However, it is not limited to the case, but the first threaded part may be a male screw and the second threaded part may be a female screw, both of the first and second threaded parts may be male screws, or both of the first and second threaded parts may be female screws. Further, the base body 42 may be the second threaded member where the second threaded part is formed, and the blade 32 may be the first threaded member where the first threaded part is formed.

In the embodiment described above, the intervening member 60A is the deformable member, and the second bolt 85 (fixing member) makes the intervening member 60A to be contracted in the radial direction so as to eliminate the backlash between the second externally-threaded part 62 and the second internally-threaded part 64 formed in the intervening member 60A, and the first internally-threaded part 52 and the first externally-threaded part 58 threadedly engaged therewith, respectively.

However, it is not limited to the case, but like the robot hand 30B illustrated in FIG. 6, the blade 32 (the other one of the first and second threaded members) may be the deformable member, and the fixing member may be bridged between the base body 42 (first slit member) and the blade 32 (deformable member) so that the inner walls of the first slit 82 are brought closer to each other, and the blade 32 is contracted in the radial direction of the differential screw 50B. The differential screw 50B may be fixed in this manner.

Further, for example, in the case of the robot hand 30C illustrated in FIG. 7, the blade 32 (the other one of the first and second threaded members) may be the deformable member, and the fixing member may be bridged between the base body 42 (first slit member) and the blade 32 (deformable member) so that the inner walls of the first slit 82 are brought to be separate from each other, and the blade 32 is extended in the radial direction of the differential screw 50B. Accordingly, the fifth externally-threaded part 110 projectingly provided to the base body 42, and the sixth externally-threaded part 112 projectingly provided to the blade 32 are also extended in the radial direction. The differential screw 50C may be fixed in this manner.

In the embodiment described above, the two second slits 68 are formed in the end part of the intervening member 60A on the base body 42 side in the axial direction. However, it is not limited to the case, but the second slit 68 may be formed on a side surface of the intervening member 60A.

Further, even if the second slit 68 is not formed in the intervening member 60A, for example, the intervening member 60A may be made of material having flexibility. Such an intervening member 60A is deformable to be contracted in the radial direction, similarly to the case where the two second slits 68 are formed.

In the embodiment described above, the fixing member is the second bolt 85. However, it is not limited to the case, but the fixing member may be, for example, a tightening member which inwardly tightens the base body 42 from both ends in the width direction, or other fixing members, as long as the fixing member is attached to the base body 42 (first member) to bring the inner walls of the first slit 82 closer to each other.

CONCLUSION

The robot hand according to the present disclosure is the robot hand configured to hold the substrate, which includes the base body, the blade defining the holding position for holding the substrate and attached at the base part to the base body, and the differential screw having the center axis perpendicular to the principal surface of the substrate existing at the holding position and configured to attach the base part of the blade to the base body. The differential screw includes the first threaded part having the first pitch, the second threaded part having the second pitch different from the first pitch, and the intervening member coaxially having the third threaded part to be threadedly engaged with the first threaded part, and the fourth threaded part to be threadedly engaged with the second threaded part. The first threaded part is provided to the base body, and the second threaded part is provided to the base part of the blade.

According to this configuration, the robot hand according to the present disclosure can move the part of the base part of the blade where the second threaded part is provided, by a difference between the first distance which is the product of the first pitch of the first threaded part and the number of rotations of the intervening member, and the second distance which is the product of the second pitch of the second threaded part and the number of rotations of the intervening member. Therefore, the inclination of the blade which defines the holding position for holding the substrate can easily be adjusted.

A plurality of differential screws may be provided, and the plurality of differential screws may be disposed at different positions from each other in a plane parallel to the principal surface of the substrate existing at the holding position.

According to this configuration, the robot hand according to the present disclosure can further easily adjust the inclination of the blade which defines the holding position for holding the substrate.

The intervening member may be provided with the manipulation part for rotary manipulation.

According to this configuration, the robot hand according to the present disclosure can further easily adjust the inclination of the blade which defines the holding position for holding the substrate.

For example, the first threaded part may be configured as the first internally-threaded part provided to be cut in either one of the base body and the blade, and the second threaded part may be configured as the first externally-threaded part projected from the other one of the base body and the blade. The intervening member may have a cylindrical shape, and may be formed, on its outer wall, with the second externally-threaded part as the third threaded part, and may be formed, on its inner wall, with the second internally-threaded part as the fourth threaded part.

The fixing device configured to secure the differential screw to either of the base body and the blade, may be further provided. The fixing device may include the slit which is cut through in either one of the base body and the blade and intersects with the first and second internally-threaded parts and the first and second externally-threaded parts in a plane perpendicular to the axial direction of the differential screw, and the fixing member attached to either one of the base body and the blade such that the inner walls of the slit can approach each other.

According to this configuration, the first internally-threaded part is deformed to be contracted in the radial direction as the inner walls of the slit approach each other. Therefore, the differential screw can be secured without being applied with external force in the axial direction. As a result, the robot hand according to the present disclosure can precisely secure the differential screw.

The robot according to the present disclosure includes the robot hand having any one of the configurations described above, and the robotic arm provided at the tip end with the robot hand and having at least one joint axis.

According to this configuration, since the robot according to the present disclosure is provided with the robot hand having any one of the configurations described above, the inclination of the blade which defines the holding position for holding the substrate can be adjusted.

For example, the robot is configured to be a horizontal articulated robot.

The fixing device according to the present disclosure is the fixing device configured to secure the differential screw. The differential screw includes the first internally-threaded part having the first pitch, the first externally-threaded part having the second pitch different from the first pitch, and the intervening member having the cylindrical shape, and coaxially having the second externally-threaded part which is formed on the outer wall thereof and to be threadedly engaged with the first internally-threaded part, and the second internally-threaded part which is formed on the inner wall thereof and to be threadedly engaged with the first externally-threaded part. The fixing device includes the slit which is cut through in the first member where the first internally-threaded part is formed and intersects with the first and second internally-threaded parts and the first and second externally-threaded parts in a plane perpendicular to the axial direction of the differential screw, and the fixing member which is attached to the first member such that the inner walls of the slit can approach each other.

According to this configuration, in the fixing device according to the present disclosure, the first internally-threaded part is deformed to be contracted in the radial direction as the inner walls of the slit approach each other. Therefore, the differential screw can be secured without being applied with external force in the axial direction. As a result, the fixing device according to the present disclosure can precisely secure the differential screw.

The fixing member may be configured as a bolt arranged so that its shaft part intersects with the slit in a plane perpendicular to the axial direction of the differential screw.

According to this configuration, the fixing device according to the present disclosure can bring the inner walls of the slit closer to each other with the simple structure.

The concave part formed at least in the end part of the intervening member on the first member side in the axial direction, may be provided.

According to this configuration, the intervening member is deformable to be contracted in the radial direction as the inner walls of the slit approach each other. As a result, the first internally-threaded part, the second internally-threaded part, the first externally-threaded part, and the second externally-threaded part of the differential screw are firmly secured to each other.

What is claimed is:

1. A robot hand configured to hold a substrate, comprising:
    a base body;
    a blade defining a holding position for holding the substrate and attached at a base part to the base body; and
    a differential screw having a center axis perpendicular to a principal surface of the substrate existing at the holding position and configured to attach the base part of the blade to the base body,
    the differential screw including:
        a first threaded part having a first pitch;
        a second threaded part having a second pitch different from the first pitch; and
        an intervening member coaxially having a third threaded part to be threadedly engaged with the first threaded part, and a fourth threaded part to be threadedly engaged with the second threaded part,
    wherein the first threaded part is provided to the base body, and the second threaded part is provided to the base part of the blade,
    one of the base body and the blade is a first internally-threaded member having a first internally-threaded part comprising the first threaded part or the second threaded part,
    a first slit is formed in the first internally-threaded member to intersect with the first internally-threaded part in a plane perpendicular to an axial direction of the first internally-threaded part, and
    the intervening member is a deformable member deformable in a radial direction.

2. The robot hand of claim 1, wherein the differential screw includes a plurality of differential screws, and
    wherein the plurality of differential screws are disposed at different positions from each other in a plane parallel to the principal surface of the substrate existing at the holding position.

3. The robot hand of claim 1, wherein the intervening member is provided with a manipulation part for rotary manipulation.

4. The robot hand of claim 1, wherein one of the first and second threaded parts is the first internally-threaded part, and the other one is a first externally-threaded part,
    wherein one of the third and fourth threaded parts to be threadedly engaged with the first externally-threaded part is a second internally-threaded part, and the other one to be threadedly engaged with the first internally-threaded part is a second externally-threaded part, and
    wherein the intervening member has a cylindrical shape, and is formed, on an outer wall, with the second externally-threaded part, and is formed, on an inner wall, with the second internally-threaded part.

5. A robot, comprising:
    the robot hand of claim 1; and
    a robotic arm provided at a tip end with the robot hand and having at least one joint axis.

6. The robot of claim 5 configured to be a horizontal articulated robot.

* * * * *